United States Patent
Galmiche et al.

(10) Patent No.: US 11,218,044 B2
(45) Date of Patent: Jan. 4, 2022

(54) ROTOR FOR AN ASYNCHRONOUS ELECTRICAL MACHINE HAVING AN END SHAFT

(71) Applicant: GE Energy Power Conversion Technology Limited, Warwickshire (GB)

(72) Inventors: Christophe Galmiche, Toul (FR); Remy Muller, Belfort (FR); Nicolas Velly, Frouard (FR)

(73) Assignee: GE Energy Power Conversion Technology Limited, Warwickshire (GB)

( * ) Notice: Subject to any disclaimer, the term of this patent is extended or adjusted under 35 U.S.C. 154(b) by 181 days.

(21) Appl. No.: 16/575,327

(22) Filed: Sep. 18, 2019

(65) Prior Publication Data
US 2020/0112214 A1     Apr. 9, 2020

(30) Foreign Application Priority Data

Sep. 9, 2018   (FR) ...................................... 1858468

(51) Int. Cl.
*H02K 1/30* (2006.01)
*H02K 17/16* (2006.01)

(52) U.S. Cl.
CPC ............. *H02K 1/30* (2013.01); *H02K 17/165* (2013.01)

(58) Field of Classification Search
CPC .... H02K 1/30; H02K 17/165; H02K 15/0012; H02K 7/003; H02K 1/28; H02K 1/22; H02K 17/16
See application file for complete search history.

(56) References Cited

U.S. PATENT DOCUMENTS 5,512,792 A * 4/1996 Bawin ...................... H02K 1/28
                                                                310/211

* cited by examiner

*Primary Examiner* — Thomas Truong
(74) *Attorney, Agent, or Firm* — Wood IP LLC

(57) ABSTRACT

Provided is a rotor for an asynchronous electrical machine having an end shaft that includes two half-shafts pressing against a cylindrical magnetic block and two short-circuit discs each placed between one different half-shaft and one of the ends of the cylindrical magnetic block. Each half-shaft includes at least one first means of retention, and each short-circuit disc includes on each of its faces at least one second means of retention and each end of the magnetic block includes at least one third means of retention, the first, second, and third means of retention mating with one another in such a way as to prevent the short-circuit discs from moving relative to the half-shafts and relative to the magnetic block.

18 Claims, 14 Drawing Sheets

ROTOR FOR AN ASYNCHRONOUS ELECTRICAL MACHINE HAVING AN END SHAFT

This invention relates to asynchronous rotating electrical machines having a cage winding, and relates more particularly to a device for immobilizing sheets incorporated into a rotor of the machine comprising an end shaft.

This invention also relates to a rotating electrical machine comprising such a rotor.

Generally, a rotor of an asynchronous rotating electrical machine comprises a laminated rotor intended to operate at high rotational velocities, particularly up to a peripheral velocity of 300 m/s, and comprises an end shaft such that the magnetic sheets of the rotor do not contain any holes at their center in order to minimize the mechanical stresses that, in the case of a rotor comprising an end shaft, concentrate around the holes and are susceptible to damage the sheets of the magnetic circuit.

The document EP0609645 describes a laminated rotor comprising an end shaft for an asynchronous electric motor.

Reference is made to FIG. 1, which depicts a cross-section of such a rotor 1 in an axial direction.

The rotor comprises two half-shafts 2 and 3 between which magnetic sheets 4 are inserted, kept compact by anchors 5 connecting the two half-shafts 2 and 3.

The magnetic sheets 4 form the magnetic mass of the rotor.

The rotor 1 respectively comprises short-circuit rings or discs 2a and 3a connecting the conductive bars (not shown), e.g. made of copper, forming a cage winding.

Each magnetic sheet 4 comprises holes 4a in which the anchors 5 are inserted, and generally has a thickness between one-tenth of a millimeter and one millimeter.

Each sheet 4 is coated with a layer of insulating varnish 6 preventing electrical contact between adjacent sheets, so as to minimize Foucault current losses and increase the motor's efficiency.

The holes 4a are designed such that the rods 5 can be inserted into the holes 4a of all of the sheets 4 stacked during the construction of the rotor, and such that there is still clearance to absorb the increase in the diameter of the anchors caused by the effect of heat when the rotor is operating.

The magnetic sheets 4 are kept in position relative to one another by shear adhesion caused by the compacting of the sheets, the presence of roughness of the surface of the magnetic sheets, and the electrically insulating varnish.

However, when the motor starts and stops, it passes through a critical bending speed corresponding to the first eigenmode of the rotor.

When the critical bending speed is reached, the rotor weakens and vibrates.

Additionally, when the motor is operating, the rotor is subjected to vibrations, impacts, and heating.

Furthermore, the asynchronous rotating electrical machine may be used in a chemically aggressive environment, leading the varnish on the magnetic sheets to deteriorate, such as when the electrical machine is used and incorporated into a motor-compressor.

In this application, the rotor is cooled by gas containing impurities and/or aggressive chemicals that eat away at the varnish before its compression and could damage the magnetic sheets.

These phenomena could cause radial sliding of the sheets, leading to a redial clearance J between the magnetic sheets.

The two half-shafts are no longer coaxial as shown in FIG. 2, causing significant rotor vibrations that could cause an emergency shutdown of the rotor, or even its destruction.

Reference can be made to the documents US2003098627, EP0225440, US20110169355, and US20160186603, which disclose a single-part rotor for an asynchronous electrical machine comprising a shaft and a magnetic block machined out of a single piece of material.

However, such a rotor requires machining that is expensive in terms of time and raw material.

Additionally, such a rotor cannot be disassembled, particularly to be transported and handled, making any replacement of, for instance, a half-shaft impossible.

The document DE19956042 discloses a rotor having an end shaft for an asynchronous rotating electrical machine comprising a magnetic block formed by a stack of metal plates compacted between two half-shafts.

The metal plates have a thickness greater than that of the metal sheets. The plates are less vulnerable to chemical aggression.

However, the sheets are kept in place by adhesion.

Centrifugal force, or shocks and vibrations, could cause the sheets to move in a radial direction.

The document DE573512 discloses a rotor for a turbo-generator comprising a magnetic block made of metal plates stacked and welded together.

Each sheet comprises a pin protruding out from a first face and a cavity formed in a second face, the pin and the cavity respectively cooperating with a cavity and pin of the adjacent sheets.

However, this rotor is not suitable for an asynchronous rotating electrical machine.

Additionally, the magnetic circuit is held in place by welding metal plates to one another, and not by compacting between two half-shafts using anchors or screws.

The document EP0509119 discloses a rotor for an asynchronous rotating electrical machine comprising a magnetic block formed by a stack of welded sheets.

However, the sheets have a shaft passing through them.

The documents JPH104658 and WO2018037486 disclose a rotor for an asynchronous rotating electrical machine comprising a single-part magnetic block through which a shaft passes.

In the document U.S. Pat. No. 6,566,778, a rotor for an asynchronous electrical machine is formed of a shaft into which copper elements are inserted to form a cage winding via a hot isostatic pressing process.

Such a process is expensive and requires a furnace to create the rotor.

These furnaces are not suitable for large rotors, such as those a meter in outer diameter and six meters in length.

Additionally, such a rotor cannot be disassembled into multiple parts, because it is a single piece.

It is therefore being proposed to remedy the shortcomings of single-part rotors or those with a single-part magnetic block or those comprising stacks of metal plates.

In light of the foregoing, there is proposed, according to one aspect, a rotor for an asynchronous electrical machine having an end shaft comprising two half-shafts pressing against a cylindrical magnetic block and two short-circuit discs each placed between one half-shaft and one of the ends of the cylindrical magnetic block.

Each half-shaft comprises at least one first means of retention, each short-circuit disc comprises on each of its faces at least one second means of retention and each end of the magnetic block comprises at least one third means of retention, the first, second, and third means of retention mating with one another in such a way as to prevent the short-circuit discs from moving relative to the half-shafts and relative to the magnetic block.

This prevents or limits the radial sliding of the sheets in the rotor, and ensures that the rotor can be disassembled.

According to one embodiment, anchors are distributed uniformly across at least one diameter of the rotor, so as to keep the magnetic block and the short-circuit discs compacted between the half-shafts.

According to another embodiment, screws are distributed uniformly across a diameter of the half-shafts passing through the short-circuit discs and trapped within the magnetic block such that the half-shafts fit around the short-circuit discs and the magnetic block.

Preferably, the first, second, and third means of retention are disposed in the center of the short-circuit disc, the half-shaft, and the magnetic block.

Advantageously, the first, second, and third means of retention are disposed uniformly or substantially uniformly on the same diameter of the short-circuit disc, the half-shaft, and the magnetic block.

Preferably, the first means of retention and the third means of retention each comprise a counterbore and the second means of retention comprises a retention pin intended to fit into the counterbore.

Advantageously, the short-circuit disc and the retention pin have a hole in their center.

According to one characteristic, the first means of retention and the third means of retention each comprise a retention pin and the second means of retention comprises a counterbore intended to accommodate the retention pin.

Preferably, the first means of retention comprises a retention pin, the third means of retention comprises a counterbore, the second means of retention of a first face of the short-circuit disc comprises a counterbore, and the second means of retention of a second face of the short-circuit disc comprises a retention pin, such that each retention pin fits into an adjacent counterbore.

Advantageously, the rotor further comprises at least one removable retention pin, the first, second, and third means of retention each comprising a counterbore mating with the removable retention pin.

Preferably, the rotor further comprises at least one removable retention pin, the first means of retention comprises a blind hole created in the half-shaft, the second means of retention comprises a hole created in the short-circuit disc such that the hole passes through the short-circuit disc, and the third means of retention comprises a hole created in the magnetic block such that the hole passes through the magnetic block, the removable retention pin fitting into the holes with or without clearance.

Advantageously, the retention pin or the removable retention pin is circular in a cylindrical, polygonal, or conical shape, and preferably square, triangular, or square topped by a triangle.

According to another embodiment, the magnetic block comprises a single-part metal body.

According to yet another embodiment, the magnetic block comprises a stack of metal plates, each metal plate comprising on each of its faces a means of retention, the adjacent means of retention being intended to mate with one another so as to prevent a metal plate from moving relative to the adjacent elements comprising a metal plate or a short-circuit disc.

Preferably, the rotor further comprises screws distributed in the metal plates comprising counterbores so as to rigidly connect adjacent metal plates, the screw heads being housed in the counterbores.

Advantageously, an electrical insulator is inserted between the half-shaft and the short-circuit disc and/or inserted between the metal plates.

Preferably, the rotor further comprises bars inserted uniformly across the same diameter of the magnetic block, the retention pin or removable retention pin being polygonal in shape and disposed at the center of the magnetic block, the number of faces of the polygon being a multiple of the number of bars and anchors.

Advantageously, the means of retention are disposed uniformly across at least one diameter of the magnetic block.

Preferably, the first, second, and third means of retention are of different types.

According to another aspect, there is proposed an asynchronous rotating electrical machine having a cage winding comprising a rotor as defined previously.

Other features and advantages of the invention will become clear on reading the following description of the embodiments of the invention, provided solely by way of non-limiting examples and with reference to the drawings, in which:

FIGS. 1 and 2, already mentioned, illustrate a rotor comprising an end shaft of a rotating electrical machine according to the state of the art;

Figure 1:
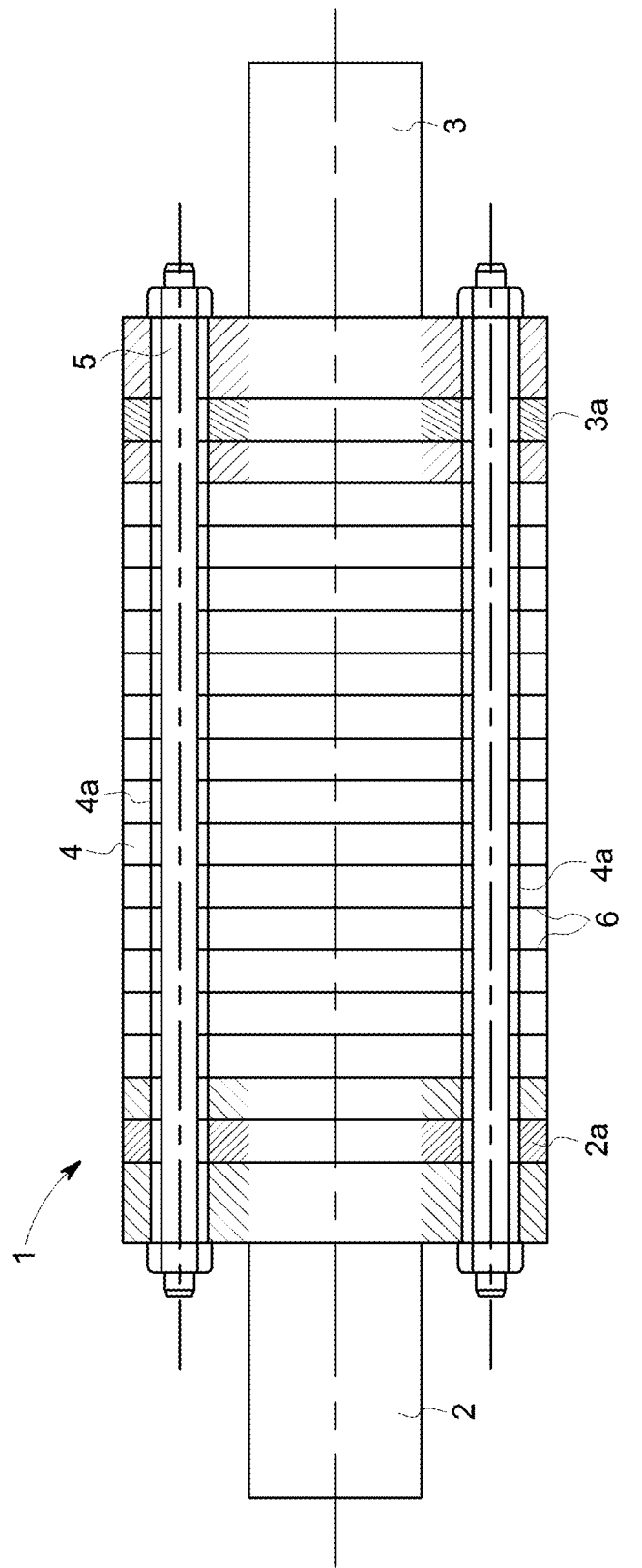
Figure 2:
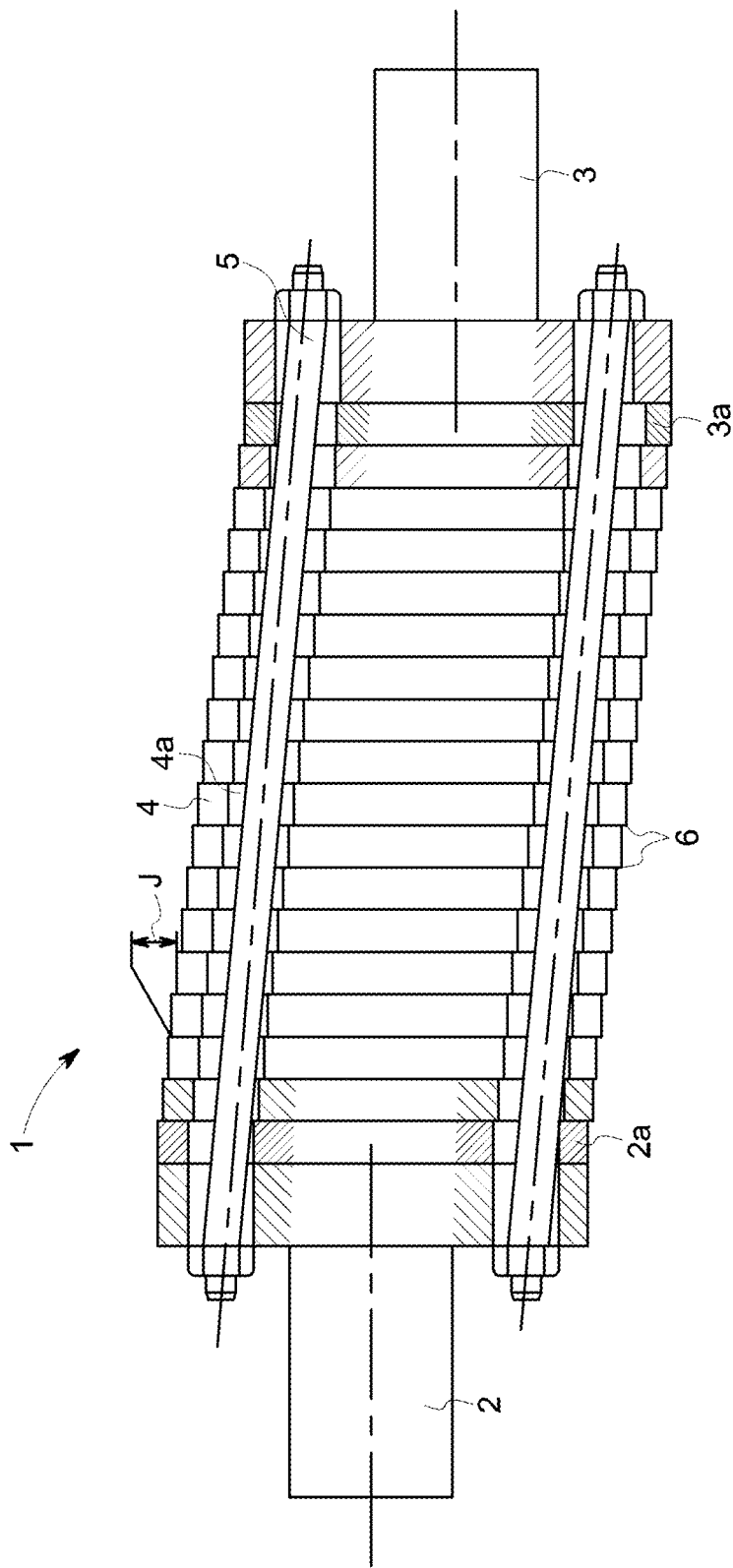
Figure 3:
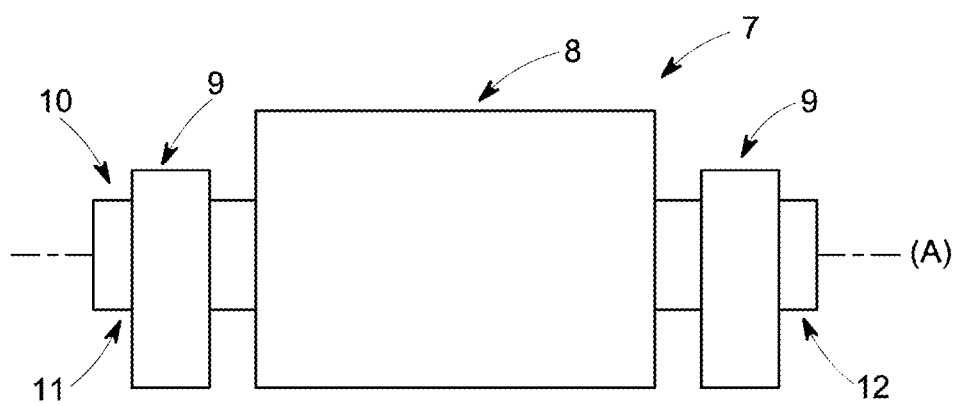
FIG. 3 illustrates an embodiment of an asynchronous rotating electrical machine.

Reference is now made to FIG. 3, which illustrates one embodiment of an asynchronous rotating electrical machine 7 comprising a stator 8, bearings 9, and a rotor 10 inserted into the stator 8 and bearings 9.

The rotor 10 comprises a rotor end shaft comprising two half-shafts 11 and 12 and an axis (A) conflated with the axis of rotation of the rotor 10.

Figure 4:
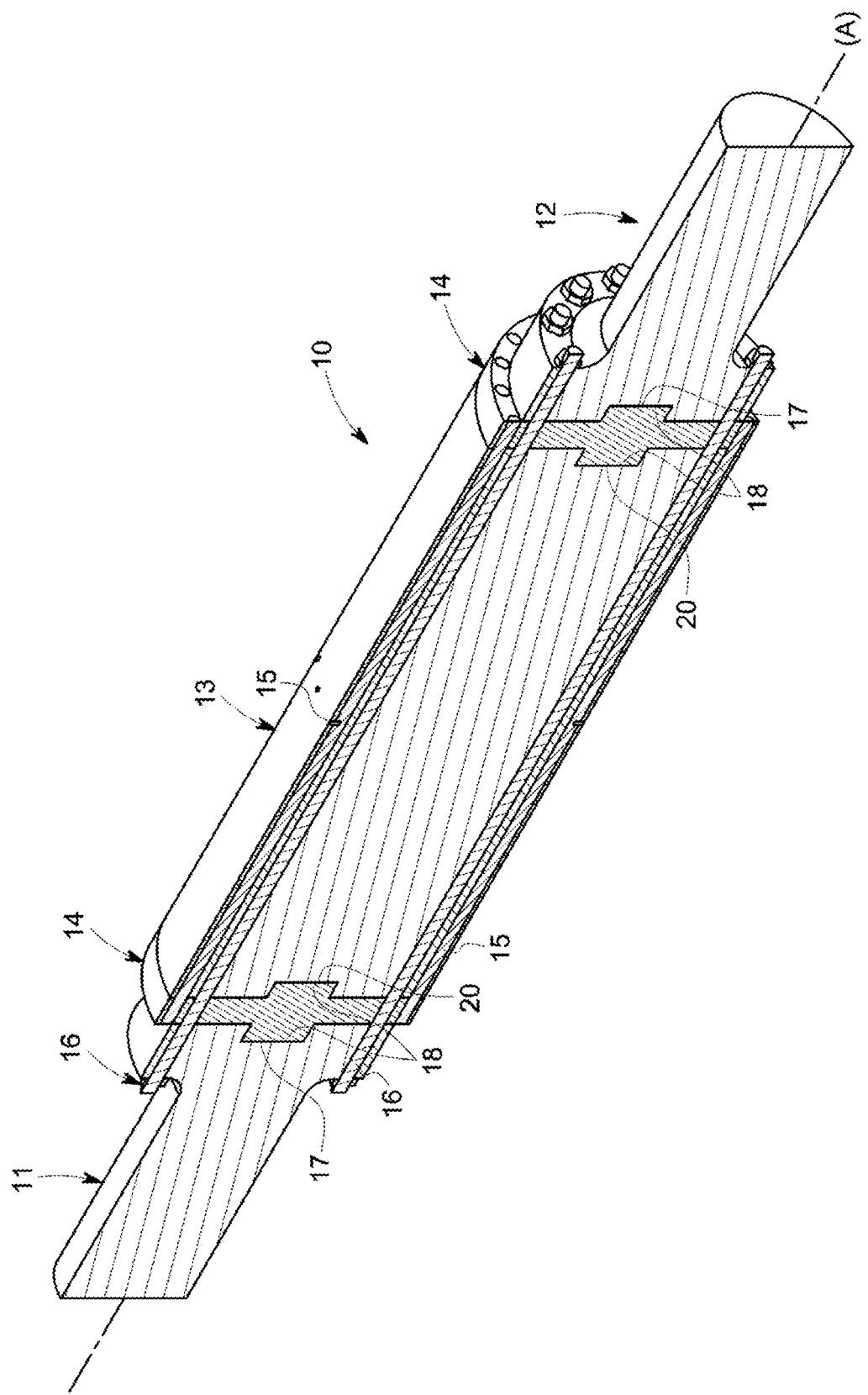
FIG. 4 illustrates a cross-section of a first embodiment of the rotor in an axial direction.

As is visible in FIG. 4, the rotor 10 further comprises a magnetic block 13, and two short-circuit discs 14 each placed between one end of the magnetic block 13 and a half-shaft 11, 12.

Bars 15 are inserted uniformly along a single diameter in the magnetic block 13.

The bars 15 and short-circuit discs 14 are made, for instance, of copper, and are electrically linked to one another to form a cage winding.

In this embodiment, the magnetic block 13 comprises a single-part metal body made, for instance, of steel.

Anchors 16 are distributed uniformly across at least one diameter of the rotor, so as to keep the magnetic block 13 and the short-circuit discs 14 compacted between the two half-shafts 11 and 12.

The ends of the anchors 16 comprise a thread in order to receive a nut.

The magnetic block 13, short-circuit discs 14 and half-shafts 11 and 12 comprise through-holes for the anchors 16, sized such that when the rotor heats up, the anchors can thermally expand, while also allowing the anchors to fit with clearance into the magnetic block.

Each half-shaft 11 and 12 comprises at least one means of retention, each short-circuit disc 14 comprises on each of its faces at least a second means of retention, and each end of the magnetic block comprises at least one third means of retention.

The first, second, and third means of retention mate with one another so as to prevent a short-circuit disc 14 from moving relative to the half-shafts 11 and 12 and relative to the magnetic block 13.

In this embodiment, the first, second, and third means of retention are disposed respectively in the center of the half-shaft 11 and 12, the center of the short-circuit disc 14, and the center of the magnetic block 13.

The first and third means of retention comprise a counterbore 17, 20 and the second means of retention comprise a retention pin 18, the pins 18 and counterbores 17 and 20 are sized so that the pin 18 fits into the counterbore 17, 20 with or without clearance.

In the following, those elements that are identical to those described previously are identified by the same reference numerals.

Figure 5:
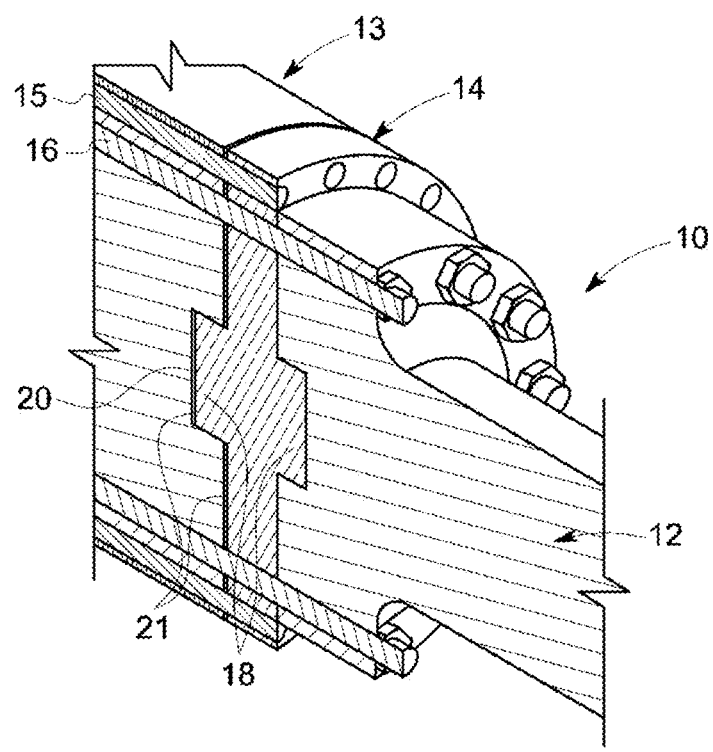
FIG. 5 illustrates a partial cross-section of a second embodiment of the rotor in an axial direction.

Reference is now made to FIG. 5, which illustrates a partial cross-section of a second embodiment of the rotor 10 in an axial direction.

The magnetic block 13, the short-circuit disc 14, the bars 15, the anchors 16, the retention pins 18, and the counterbores 20 can be seen.

In this embodiment, an electrical insulator 21 separates the magnetic block 13 and the short-circuit disc 14 on part of their contact surface.

The electrical insulator 21 is made up of a ring having a hole facing each pin 18 to allow through the pin 18 and of a disc facing each pin 18.

In one variant not shown, the electrical insulator is an insulating varnish deposited on a thin sheet, such as one made of steel, the thin sheet comprising a ring, and a disc facing each pin 18 being inserted between the magnetic mass 13 and the short-circuit disc 14.

Likewise, in one variant not shown, the insulator 21 comprising an insulating ring and an insulating disc facing each pin 18, or an insulating varnish deposited on a thin sheet, is inserted between each metal plate as depicted in FIGS. 10 to 14, which limits the leakage currents in order to improve the efficiency of the rotating electrical machine 7.

The partial electrical insulation between the magnetic mass 13 and the short-circuit discs 14 makes it possible to reduce leakage currents.

Consequently, the heating of the rotor 10 is reduced.

The efficiency of the rotating electrical machine 7 is improved.

Figure 6:
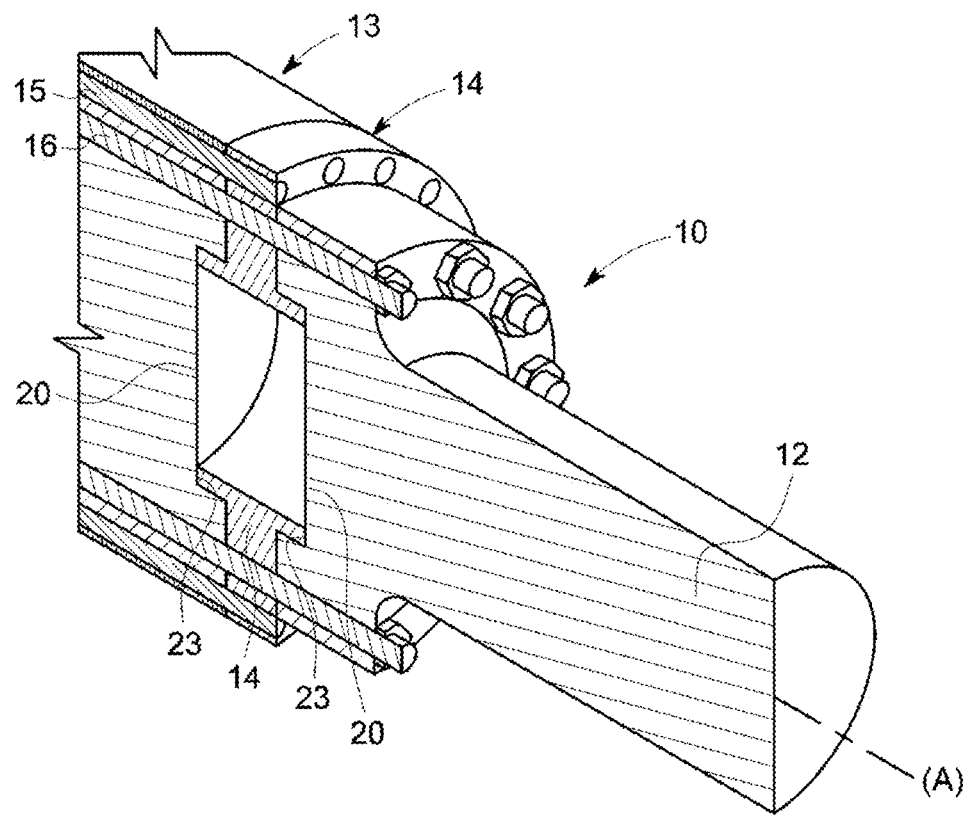
FIG. 6 illustrates a partial cross-section of a third embodiment of the rotor in an axial direction.

Reference is now made to FIG. 6, which illustrates a partial cross-section of a third embodiment of the rotor 10 in an axial direction.

The magnetic block 13, the bars 15, the anchors 16, the retention pins 23, and the counterbores 20 can be seen.

In this embodiment, the short-circuit disc 14 has a hole in its center, and the second means of retention of the short-circuit disc 14 comprises a retention pin 23 having a hole in its center so as to form two retention collars each intended to fit with or without clearance into the counterbore 20.

Those center holes make it possible to reduce the quantity of copper so as to lessen the mass of the rotor 10.

This lessening makes it possible to increase the value of the critical bending speed of the rotor 10, which makes it possible to increase the running velocity of the rotating electrical machine 7 and as a result its electrical power.

Figure 7:
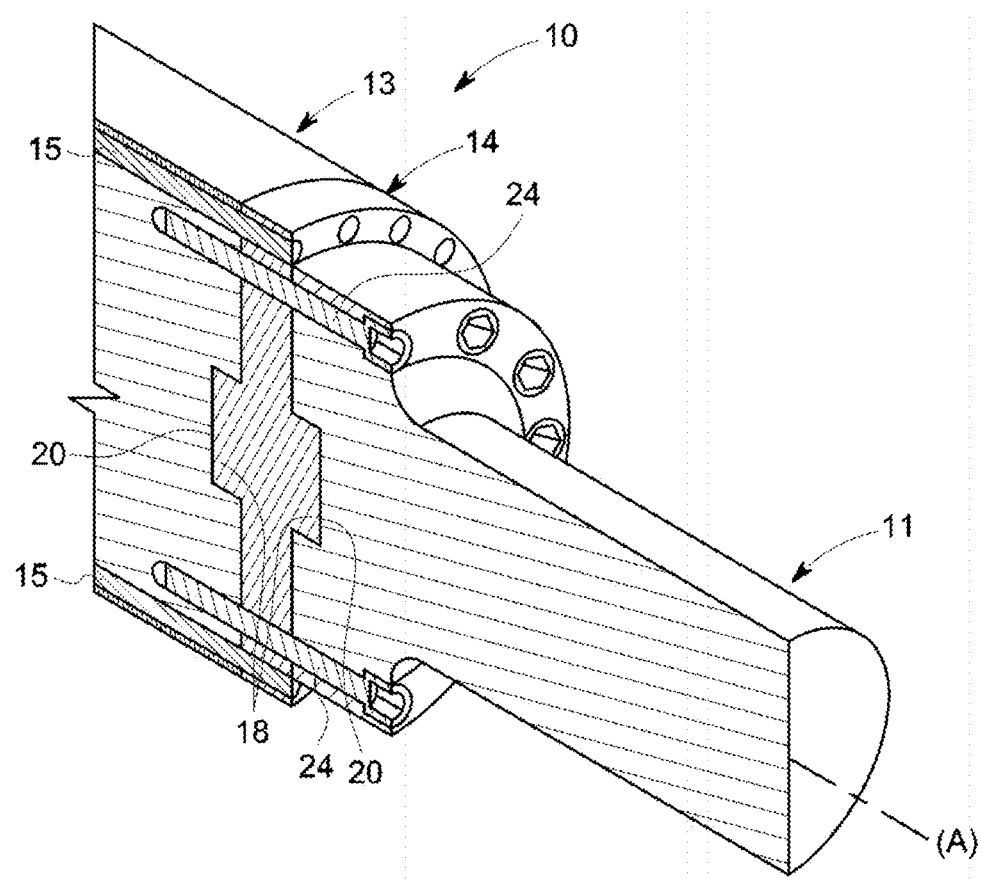
FIG. 7 illustrates a partial cross-section of a fourth embodiment of the rotor in an axial direction.

According to a fourth embodiment of the rotor 10, visible in FIG. 7, screws 24 are distributed uniformly on a diameter of the half-shafts 11 and 12 and pass through short-circuit discs 14.

The screws 24 are trapped in the magnetic block 13 such that the half-shafts 11 and 12 fit around the short-circuit discs 14 and the magnetic block 13.

Figure 8:
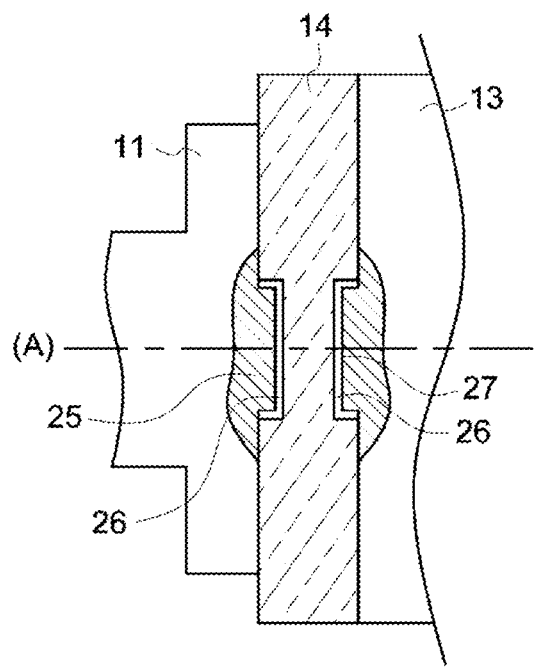
FIG. 8 illustrates a partial cross-section of a fifth embodiment of the rotor in an axial direction.

According to a fifth embodiment (FIG. 8), the first means of retention and the third means of retention each comprise a retention pin 25 and 27, and the second means of retention comprises a counterbore 26.

The retention pins 25 and 27 and the counterbore 26 are sized so that the retention pins fit into a counterbore.

Figure 9:
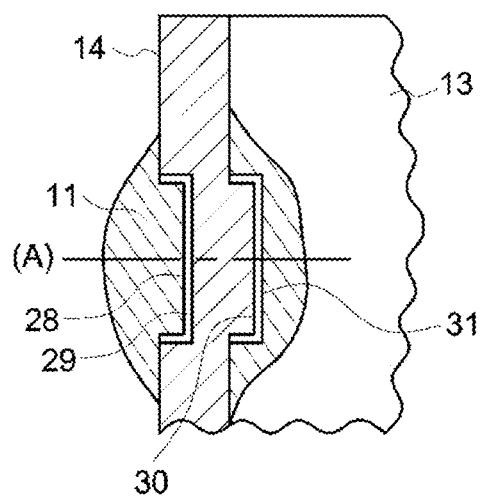
FIG. 9 illustrates a partial cross-section of a sixth embodiment of the rotor in an axial direction.

Reference is now made to FIG. 9, which illustrates a sixth embodiment of the rotor 10.

In this embodiment, the first means of retention comprises a retention pin 28, the third means of retention comprises a counterbore 31, the second means of retention of a first face of the short-circuit disc comprises a counterbore 29, and the second means of retention of a second face of the short-circuit disc comprises a retention pin 30.

The retention pin 28 of the half-shaft 11, the counterbore 29, and the retention pin 30 of the short-circuit disc, and the counterbore 31 of the magnetic block 13 are sized so that the retention pins each fit into a counterbore with or without clearance.

Figure 10:
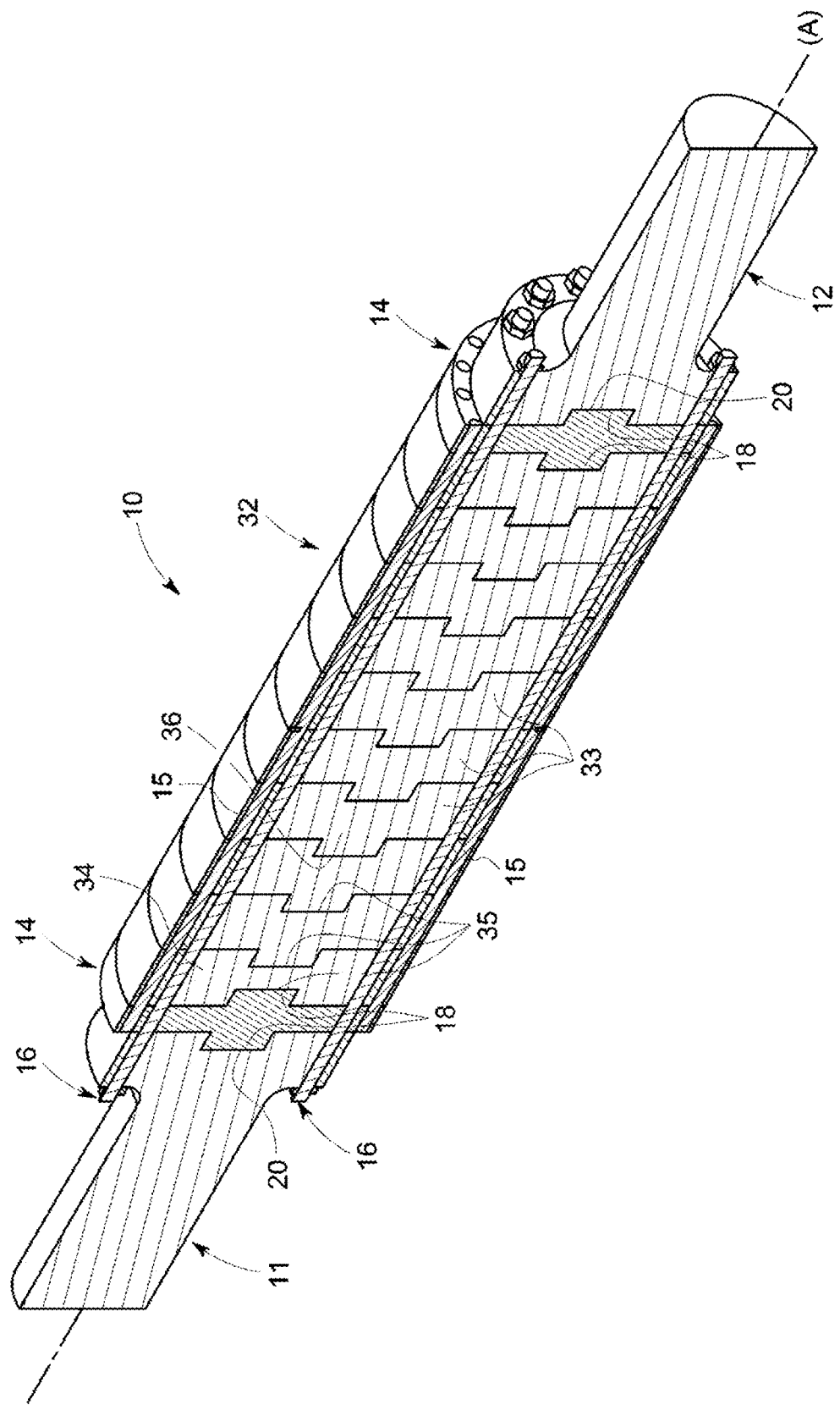
FIG. 10 illustrates a cross-section of a seventh embodiment of the rotor in an axial direction.

Reference is now made to FIG. 10, which illustrates a cross-section of a seventh embodiment of the rotor 10 in an axial direction.

The half-shafts 11 and 12 comprising the counterbores 20, the short-circuit discs 14 comprising the retention pins 18, the bars 15, and the anchors 16 can be seen.

The rotor 10 comprises a magnetic block 32 comprising a stack of metal plates 33 and 34.

The metal plate referenced as 34 is located at one of the ends of the magnetic plate 32.

Each metal plate 33 and 34 comprises a means of retention on each of its faces.

The means of retention of the plate referenced as 33 comprise on a first face of said plate a counterbore 35 and on a second face a retention pin 36, such that the retention pin 36 fits with or without clearance into an adjacent counterbore 35 such that, for a plate 33 located at the end of the magnetic block 32, the retention pin 18 of the short-circuit disc 14 fits with or without clearance into a counterbore 35 of said plate 33.

The means of retention of the first and second faces of the metal plate are able to mate with or without clearance with the means of retention of the adjacent plates so as to prevent the metal plate from moving relative to the adjacent metal plates 33, 34.

The plate referenced as 34 comprises on each of its faces a counterbore 35 so that the retention pin 18 and 36 fits with or without clearance into an adjacent counterbore 35.

The plate referenced as 34 comprises the third means of retention mating with the second means of retention of the short-circuit disc 14 comprising the pin 18 so as to prevent the metal plate referenced as 34 from moving relative to an adjacent element comprising the metal plate referenced as 33 or the short-circuit disc 14.

Figure 11:
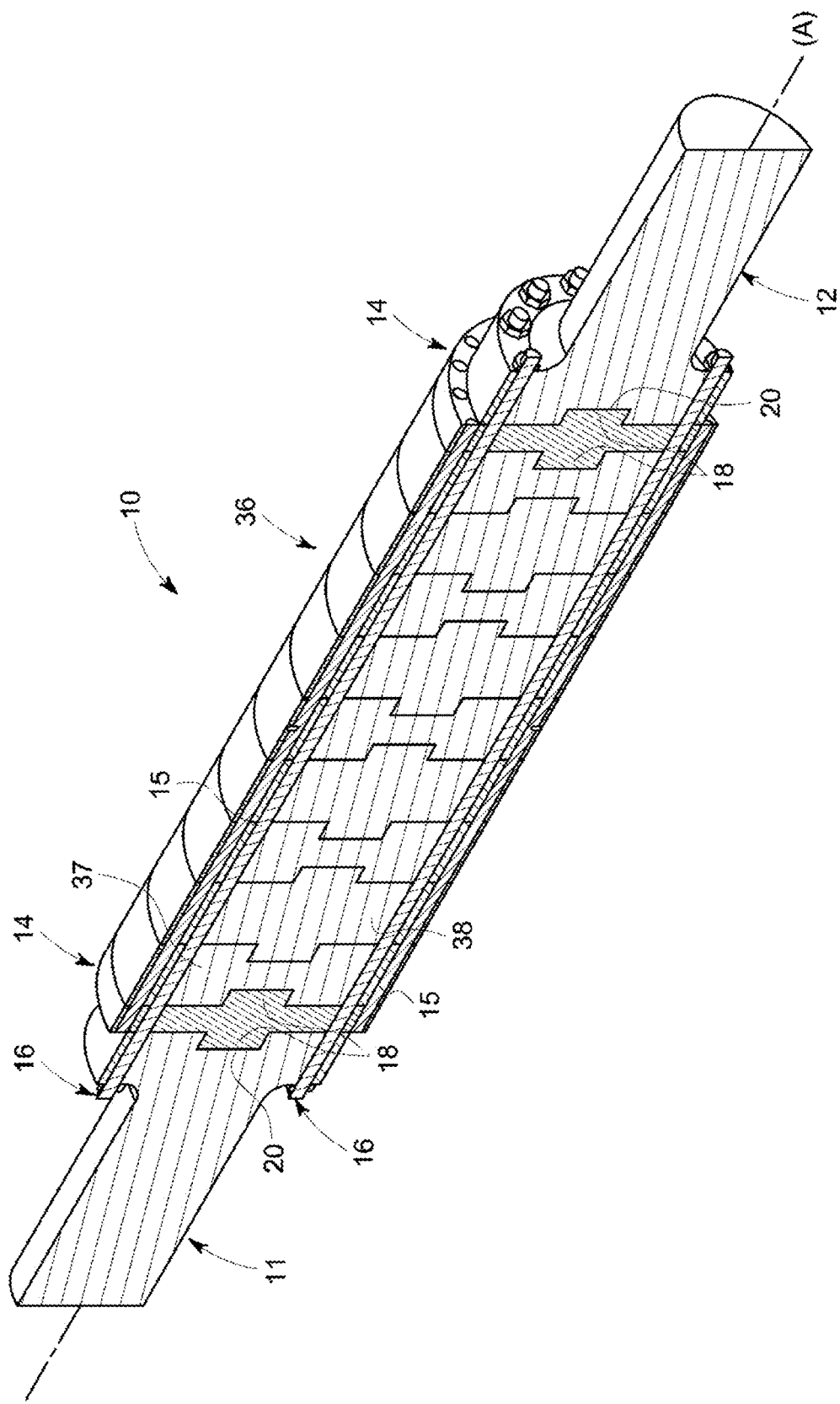
FIG. 11 illustrates a cross-section of an eighth embodiment of the rotor in an axial direction.

According to an eighth embodiment of the rotor 10, visible in FIG. 11, which depicts the half-shafts 11 and 12 comprising the counterbores 20, the short-circuit discs 14 comprising the retention pins 18, the bars 15, and the anchors 16, the rotor 10 comprises a magnetic block 36 comprising a stack of metal plates 37 and 38, alternating with one another.

The metal plates 37 and 38 each comprise on their first and second faces an identical means of retention.

The means of retention of the plates referenced as 37 comprise a counterbore on each face and the means of retention of the plates referenced as 38 comprise a pin on each face.

The plates referenced as 37 and 38 are stacked in alternating fashion so that a pin fits with or without clearance into an adjacent counterbore and so that the third means of retention of the plates 37 at the end of the magnetic block mate with the second means of retention of the short-circuit disc 14 so as to prevent a metal plate from moving relative to an adjacent element comprising a metal plate 37, 38 or the short-circuit disc 14.

Figure 12:
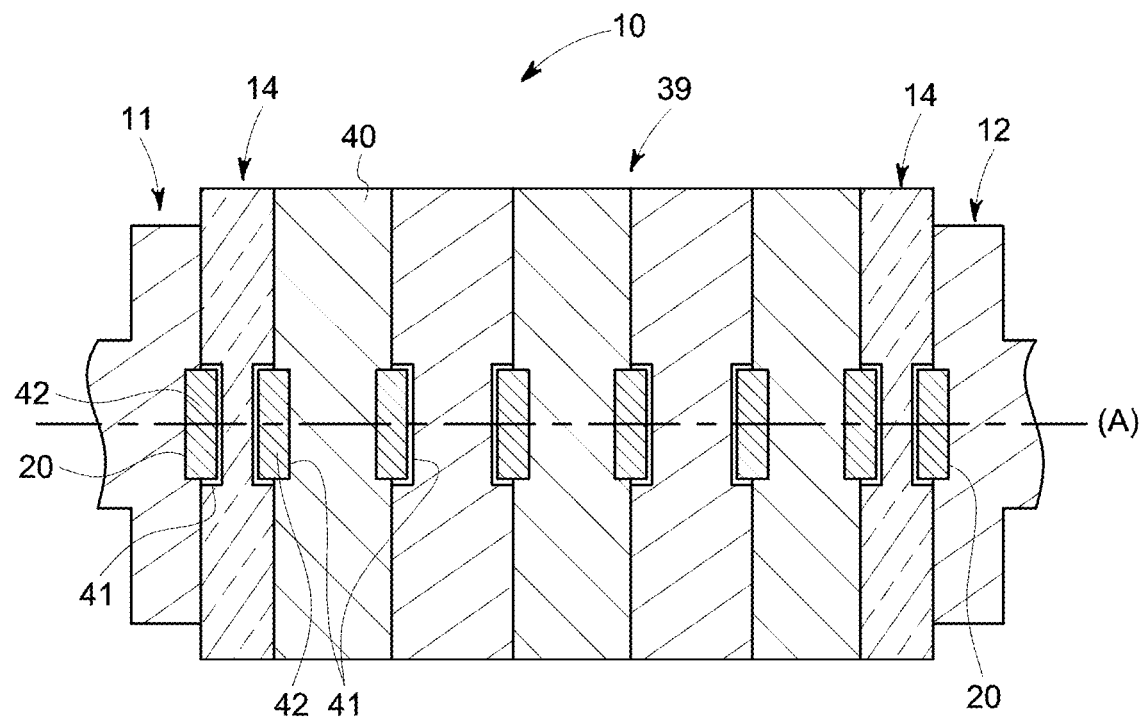
FIG. 12 illustrates a partial cross-section of a ninth embodiment of the rotor in an axial direction.

In the embodiment of FIG. 12, the rotor 10 comprises a magnetic block 39 comprising a stack of metal plates 40.

Each metal plate 40 comprises on each of its faces a means of retention comprising a counterbore 41 accommodating with or without clearance a removable retention pin 42 so as to prevent the metal plate from moving relative to the adjacent metal plates.

The plates 40 located at the ends of the magnetic block 39 each comprise the third means of retention mating with the second means of retention of the short-circuit disc 14 so as to prevent the metal plate from moving relative to the short-circuit disc 14.

In this embodiment, the first, second, and third means of retention each comprise a counterbore identical to the counterbore 41 accommodating a removable retention pin 42.

The removable retention pin 42 may, if it is rigidly connected to one or both faces of a metal plate 40, be bonded to the plate or shrink-fitted into the counterbore 41 of the plate. If the pin is shrink-fitted, the temperature differential needed for the shrink-fitting is achieved either by heating the plate, or preferably by cooling the removable pin, e.g. by plunging the pin into liquid nitrogen.

According to other embodiments, the first, second, and third means of retention may be of different types.

Figure 13:
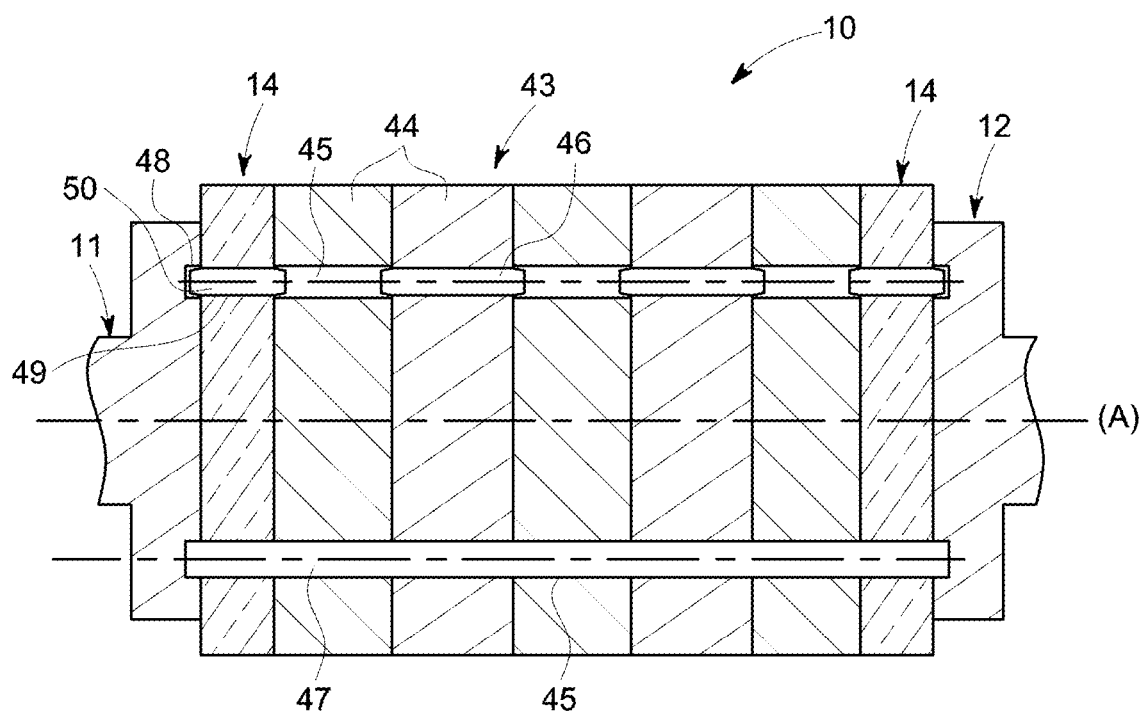
FIG. 13 illustrates a partial cross-section of a tenth embodiment of the rotor in an axial direction.

Reference is now made to FIG. 13, which illustrates a partial cross-section of a tenth embodiment of the rotor 10 in an axial direction.

In this embodiment, the rotor 10 comprises a magnetic block 43 comprising a stack of metal plates 44.

Each metal plate 44 comprises through-holes 45 so that each hole 45 mates with or without clearance with a removable retention pin 46 so as to prevent a metal plate 44 from moving relative to the adjacent metal plates.

The plates 44 located at the ends of the magnetic block 43 each comprise the third means of retention comprising a hole 45 mating with the second means of retention of the short-circuit disc 14 so as to prevent the metal plate from moving relative to the short-circuit disc 14.

In this embodiment, the first means of retention comprises a blind hole 48, the second means of retention comprises a hole 49 such that the hole 49 passes through the short-circuit disc 14, a removable retention pin 50 fitting with or without clearance into the holes referenced as 45, 48, and 49.

According to other embodiments, the first, second, and third means of retention may be of different types.

According to another embodiment, the retention pins referenced as 46 and 50 are replaced by a rod 47 fitting with or without clearance into the holes 45, 49 and housed in the blind holes 48.

In the embodiments of the rotor 10 comprising metal plates described previously, the metal plates are held in place in the axial direction (A) by anchors.

In one variant, the metal plates are screwed to one another.

Figure 14:
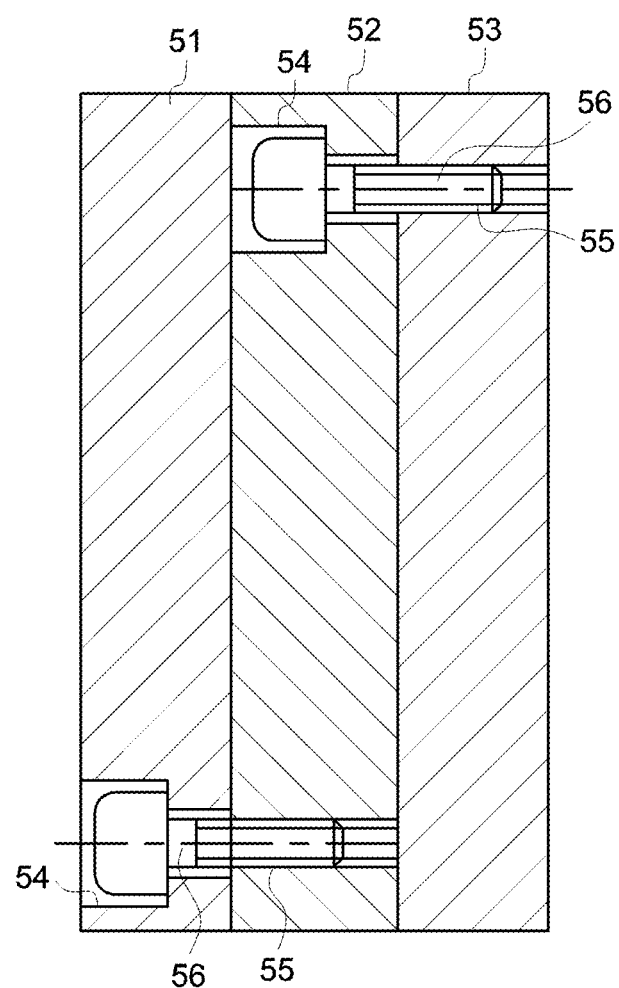
FIG. 14 illustrates an embodiment of metal plates held in place by screws.

As is visible in FIG. 14, the metal plates 51, 52 and 53 can be held in place by screws.

In such a case, the plates 51 and 52 each comprise a counterbore 54 in order to fit the heads of the screws 56 into the thickness of the plate, and the plates 52 and 53 each comprise a threaded hole 55.

Screws 56 rigidly connect the plates 51, 52 and 53 to one another by being screwed into the threaded holes 55.

The number and location of the screws are determined such that a metal plate does not move relative to the other metal plates when the rotor 10 is rotationally driven and subjected to a torque or overtorque applied to its half-shafts.

Each plate 51, 52, 53 comprises, in alternating fashion, counterbores 54 for allowing through screws 56 and threaded holes 55 mating with the threaded parts of the screws 56. This way, each plate is fastened by screws and rigidly connected to the adjacent plates.

In one variant not shown, the metal plates are rigidly connected by compacting with anchors linking the two plates located at the ends of the magnetic block, the plates having holes for allowing the anchors through, and the two end plates comprising counterbores for receiving the nuts at the ends of the anchors, or one or two plates comprising threaded holes receiving the threaded ends of the anchors. Next, the magnetic block is fastened by screws to the half-shafts as shown in FIG. 7.

In the embodiments of the rotor 10 comprising metal plates described previously, the metal plates may be of the same thickness or of different thicknesses.

The thickness of the metal plates is chosen so that it is greater than 40% of the thickness of the short-circuit disc 14 and greater than 5% of the outer diameter of the rotor 10, preferably from 15 to 60% of the outer diameter of the rotor.

According to other embodiments, means of retention are disposed uniformly across at least one diameter of the magnetic block.

Figure 15:
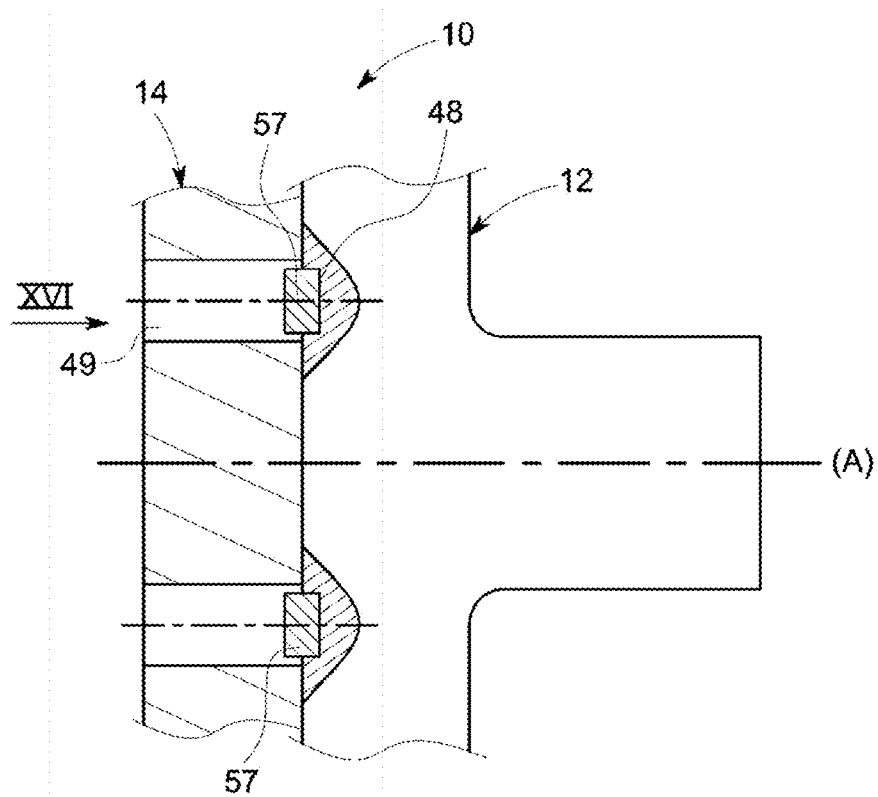
FIGS. 15 and 16 illustrate an eleventh embodiment of the rotor.
Figure 16:
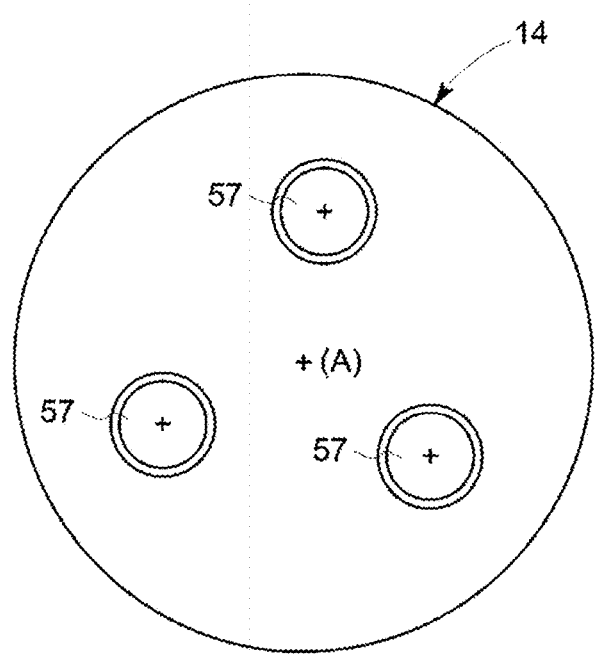

FIGS. 15 and 16 illustrate a partial cross-section of an eleventh embodiment of the rotor 10 in an axial direction and a front view of the short-circuit disc 14 in the direction XVI.

The half-shaft 12 comprising blind holes 48, the short-circuit disc 14 comprising through-holes 49, and removable retention pins 57 can be seen.

In this embodiment, the three removable retention pins 57 are cylindrical and are disposed on the same diameter of the short-circuit disc 14; in variants not shown, there may also be 2, 4, 5, or more retention pins machined in the half-shafts or metal plates or short-circuit discs or removable pins, substantially distributed uniformly across the same diameter, or in two or more rows with two or more concentric diameters.

The retention pins and removable retention pins may, for instance, be circular, in a shape that is cylindrical or conical, square, rhomboid, triangular, trapezoidal, square topped by a triangle, or polygonal.

Figure 17:
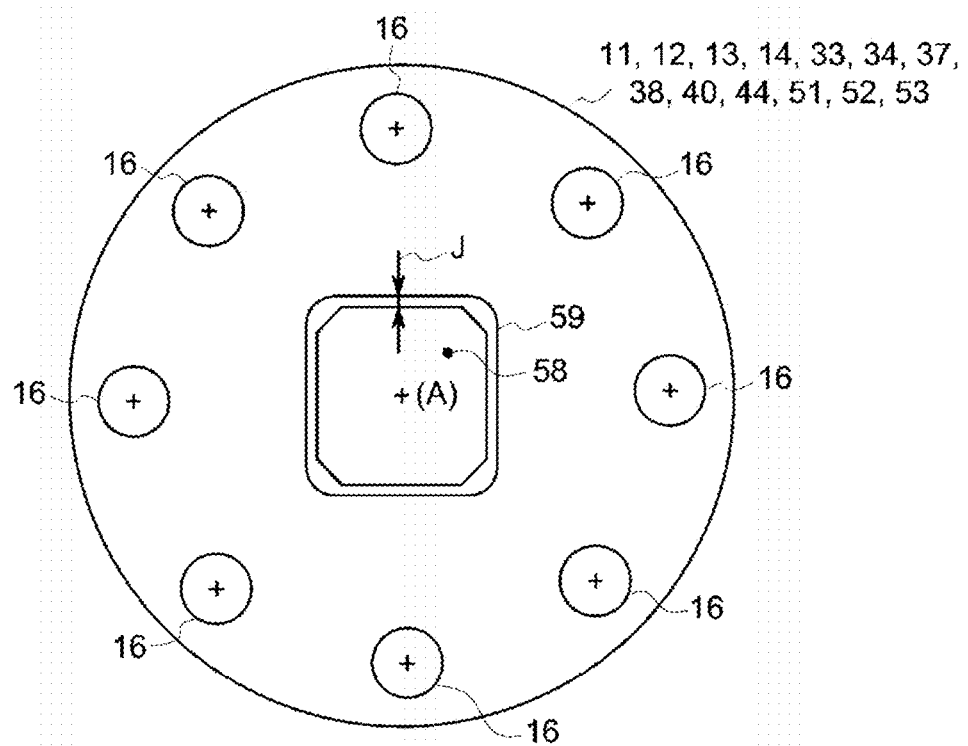
FIGS. 17 to 19 illustrate embodiments of the short-circuit disc.
Figure 18:
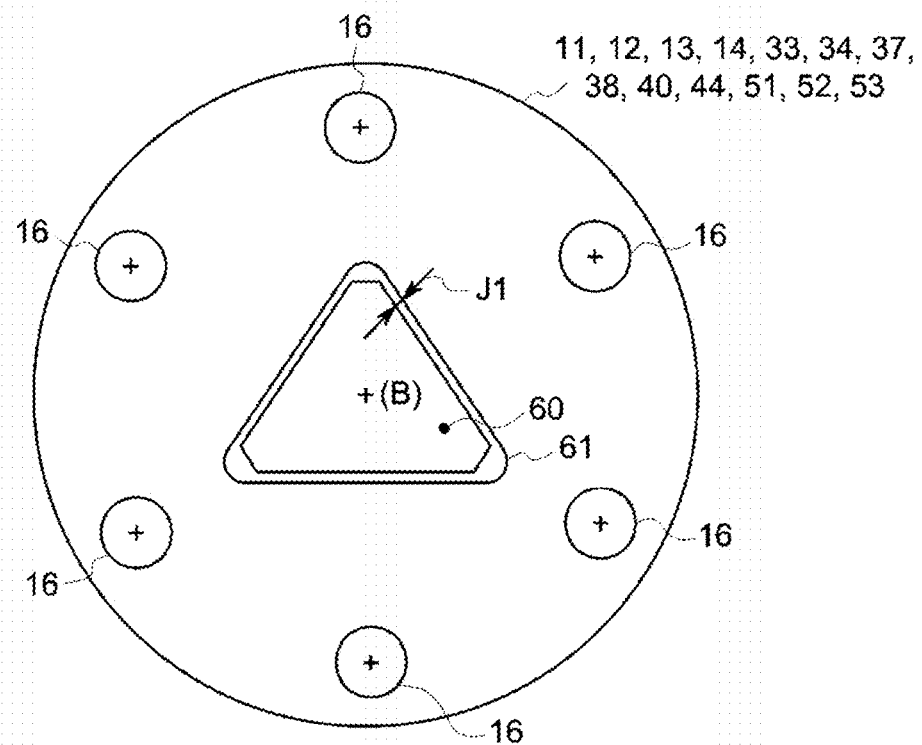

FIGS. 17 and 18 illustrate a front view of the short-circuit disc 14 comprising the second means of retention at its center, or a front view of a half-shaft 11, 12 or a metal plate 13, 33, 34, 37, 38, 40, 44, 51, 52, 53 of the magnetic block.

FIG. 17 illustrates, for instance, the first means of retention comprising a machined or removable square retention pin 58 and the second means of retention comprising a square hole 59 accommodating the retention pin 58 with or without clearance J.

The anchors 16 pass through the short-circuit discs 14, half-shafts or metal plates.

The number of sides of the pin 58 is a multiple of the number of copper bars 15 (not shown in FIG. 17) and anchors 16, thereby enabling multiple angular positions of the half-shaft or short-circuit disc or metal plates, when stacking and manufacturing the rotor. As shown in FIG. 17, a four-sided square pin is a multiple of eight anchors, or as shown in FIG. 18, a three-sided triangular pin is multiple and compatible with six anchors.

Advantageously, this configuration makes it possible to avoid using positioning guides when installing the rotor.

Additionally, such a retention pin, whether machined or removable, makes it possible to transmit a sizable torque between the short-circuit disc 14 and the half-shaft, or between metal plates, via the sides of the polygon.

According to another embodiment, the machined or removable retention pin may be an asymmetrical polygon, such as, for instance, a square topped with a triangle, making it possible to use it as a positioning guide as well as a unique angular position if need be for the half-shaft, short-circuit disc, or metal plates.

The compacting force of the anchors may be reduced because the torque only travels through the surfaces of the plates in contact. Thus, the number of anchors may be reduced, or the cross-section of the anchors may be reduced in the case of a rotor comprising anchors.

Advantageously, polygonal retention pins enable the rotor to transmit a much higher torque than an adhesion torque transmission between adjacent elements such as half-shafts, short-circuit discs, or metal plates.

FIG. 18 illustrates the first means of retention comprising a machined or removable triangular pin 60 and the corresponding second or third means of retention comprising a triangular hole 61 accommodating the pin 60 with or without clearance J1, and the anchors 16.

The number of sides of the pin 60 is a multiple of the number of anchors 16 and copper bars 15 (not shown in FIG. 18).

In one variant not shown in FIGS. 4 to 6, 10 and 11, a threaded end of the anchors 16 is screwed into a threaded hole of the half-shaft 11 or 12, and the other end of the anchors passes through a hole in the half-shaft 12 or 11 to accommodate a nut.

Figure 19:
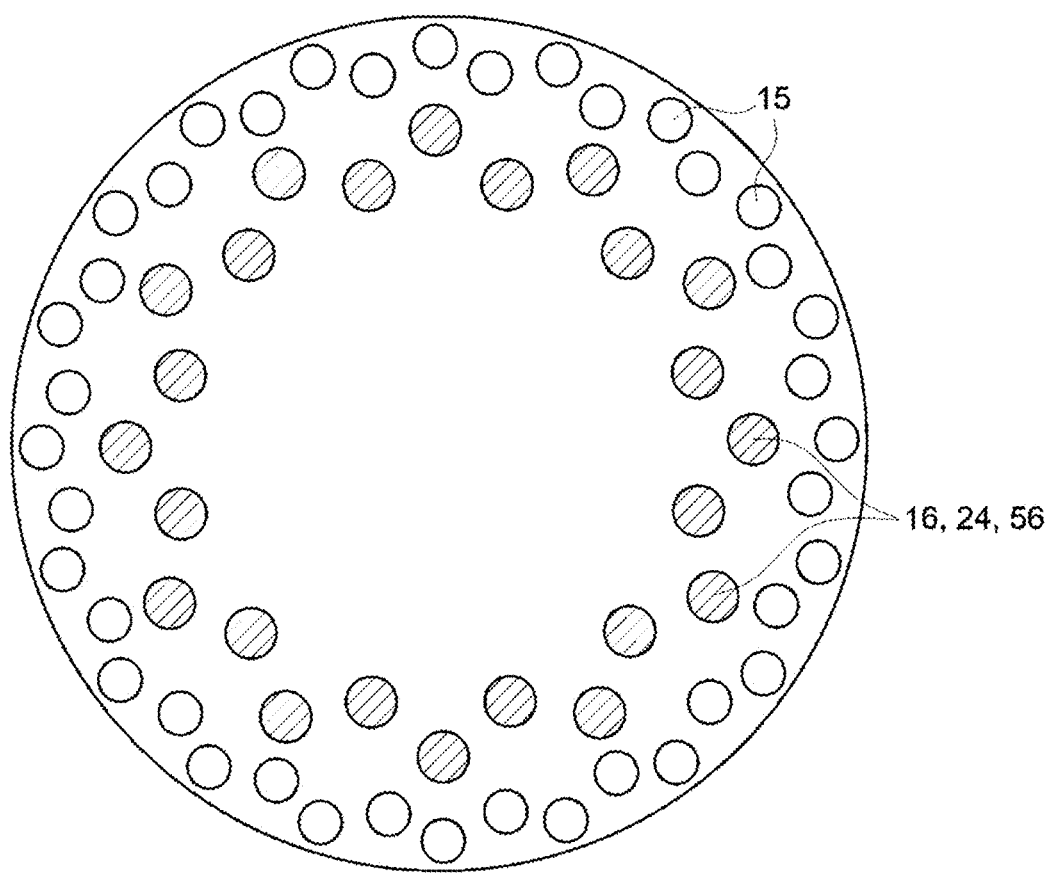

FIG. 19 illustrates a variant embodiment having two or more rows of copper bars 15 disposed along two or more substantially concentric diameters, or two or more rows of anchors 16 or fastening screws 24, 56 disposed along two or more substantially concentric diameters.

In variants not shown, the bars 15 are rectangular in shape, rectangular with rounded edges, or oblong in shape.

The bars 15 are preferably made of copper or a copper alloy, but may also be made of aluminum, an aluminum alloy, or any other electrically conductive material.

What is claimed is:

1. A rotor for an asynchronous electrical machine comprising:
   a cylindrical magnetic block;
   two short-circuit discs; and
   an end shaft comprising two half-shafts pressing against the cylindrical magnetic block and the two short-circuit discs, each short-circuit discs being placed between one half-shaft and one of the ends of the cylindrical magnetic block,
   wherein each half-shaft comprises at least one first means of retention, each short-circuit disc comprises on each of its faces at least one second means of retention and each end of the magnetic block comprises at least one third means of retention, wherein the first, second, and third means of retention mate with one another to prevent the short-circuit discs from moving relative to the half-shafts and relative to the magnetic block, and the first, second, and third means of retention are disposed in the center of the short-circuit disc, the half-shaft, and the magnetic block.

2. A rotor according to claim 1, further comprising anchors distributed uniformly across at least one diameter of the rotor to keep the magnetic block and the short-circuit discs compacted between the half-shafts.

3. A rotor according to claim 1, further comprising screws distributed uniformly across a diameter of the half-shafts passing through the short-circuit discs and trapped within the magnetic block such that the half-shafts fit around the short-circuit discs and the magnetic block.

4. A rotor according to claim 3, wherein the first, second, and third means of retention are disposed uniformly or distributed substantially uniformly on the same diameter of the short-circuit disc, the half-shaft, and the magnetic block.

5. A rotor according to claim 4, wherein the first means of retention and the third means of retention each comprise a counterbore and the second means of retention comprises a retention pin intended to fit into the counterbore.

6. A rotor according to claim 5, wherein the short-circuit disc and the retention pin have a hole in their center.

7. A rotor according to claim 4, wherein the first means of retention and the third means of retention each comprise a retention pin and the second means of retention comprises a counterbore intended to accommodate the retention pin.

8. A rotor according claim 4, wherein the first means of retention comprises a retention pin, the third means of retention comprises a counterbore, the second means of retention of a first face of the short-circuit disc comprises a counterbore, and the second means of retention of a second face of the short-circuit disc comprises a retention pin, such that each retention pin fits into an adjacent counterbore.

9. A rotor according to claim 4, further comprising at least one removable retention pin, the first, second, and third means of retention each comprising a counterbore mating with the removable retention pin.

10. A rotor according to claim 4, further comprising at least one removable retention pin, and the first means of retention comprises a blind hole created in the half-shaft, the second means of retention comprises a hole created in the short-circuit disc such that the hole passes through the short-circuit disc, and the third means of retention comprises a hole created in the magnetic block such that the hole passes through the magnetic block, the removable retention pin fitting into the holes with or without clearance.

11. A rotor according to claim 10, wherein the retention pin or the removable retention pin is circular in a cylindrical, polygonal, or conical shape, and preferably square, triangular, or square topped by a triangle.

12. A rotor according to claim 11, wherein the magnetic block comprises a single-part metal body.

13. A rotor according to claim 11, wherein the magnetic block comprises a stack of metal plates, each metal plate comprising on each of its faces a means of retention, the adjacent means of retention being intended to mate with one another to prevent a metal plate from moving relative to the adjacent elements comprising a metal plate or a short-circuit disc.

14. A rotor according to claim 13, further comprising screws distributed in the metal plates comprising counterbores to rigidly connect adjacent metal plates, the screw heads being housed in the counterbores.

15. A rotor according to claim 14, wherein an electrical insulator is inserted between the half-shaft and the short-circuit disc and/or inserted between the metal plates.

16. A rotor according to claim 15, further comprising bars inserted uniformly across the same diameter of the magnetic block, the retention pin or removable retention pin being polygonal in shape and disposed at the center of the magnetic block, the number of faces of the polygon being a multiple of the number of bars and anchors.

17. A rotor according to claim 15, wherein means of retention are disposed uniformly across at least one diameter of the magnetic block.

18. A rotor according to claim 17, wherein the first, second, and third means of retention are of different types.

* * * * *